June 13, 1939. M. EWALD 2,161,807
FRUIT CUTTING AND DISCHARGING MEANS
Original Filed April 4, 1935 5 Sheets-Sheet 3
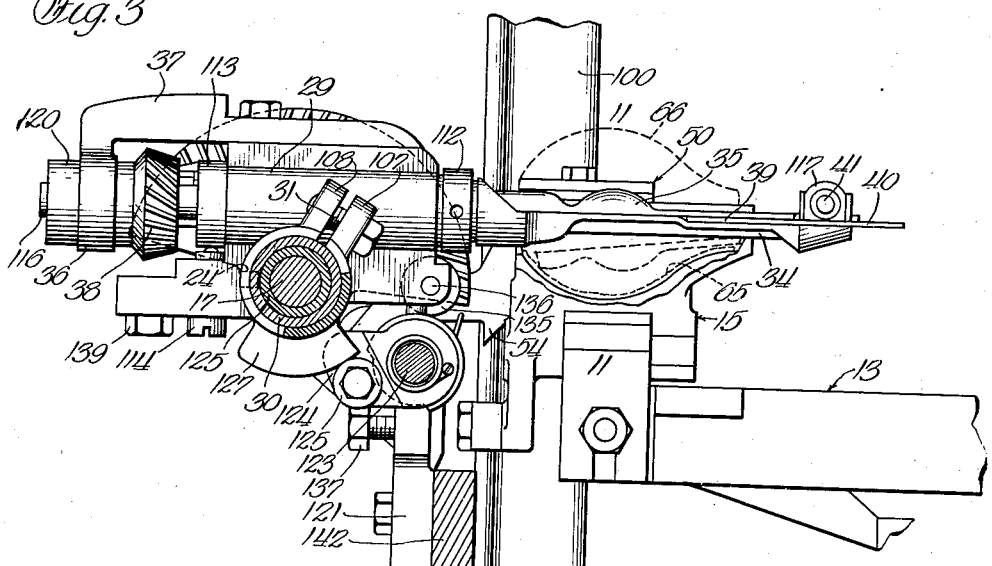
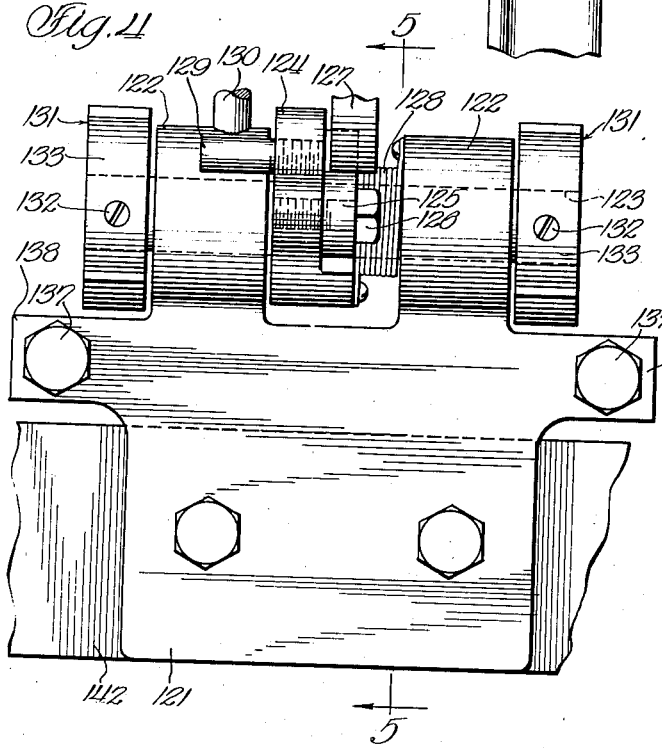
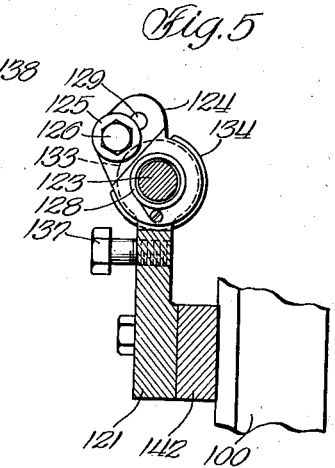
Inventor:
Mark Ewald
By [signature]
Atty.

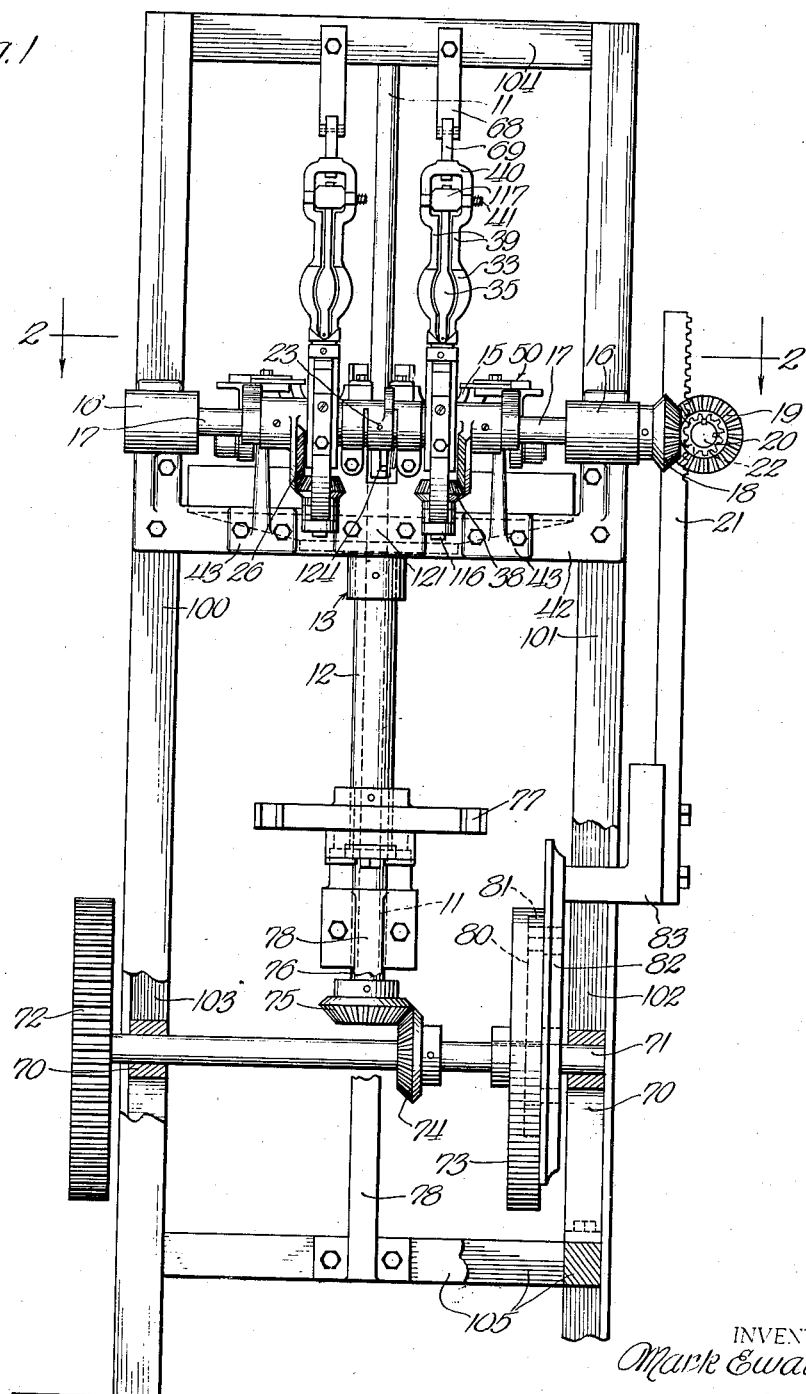

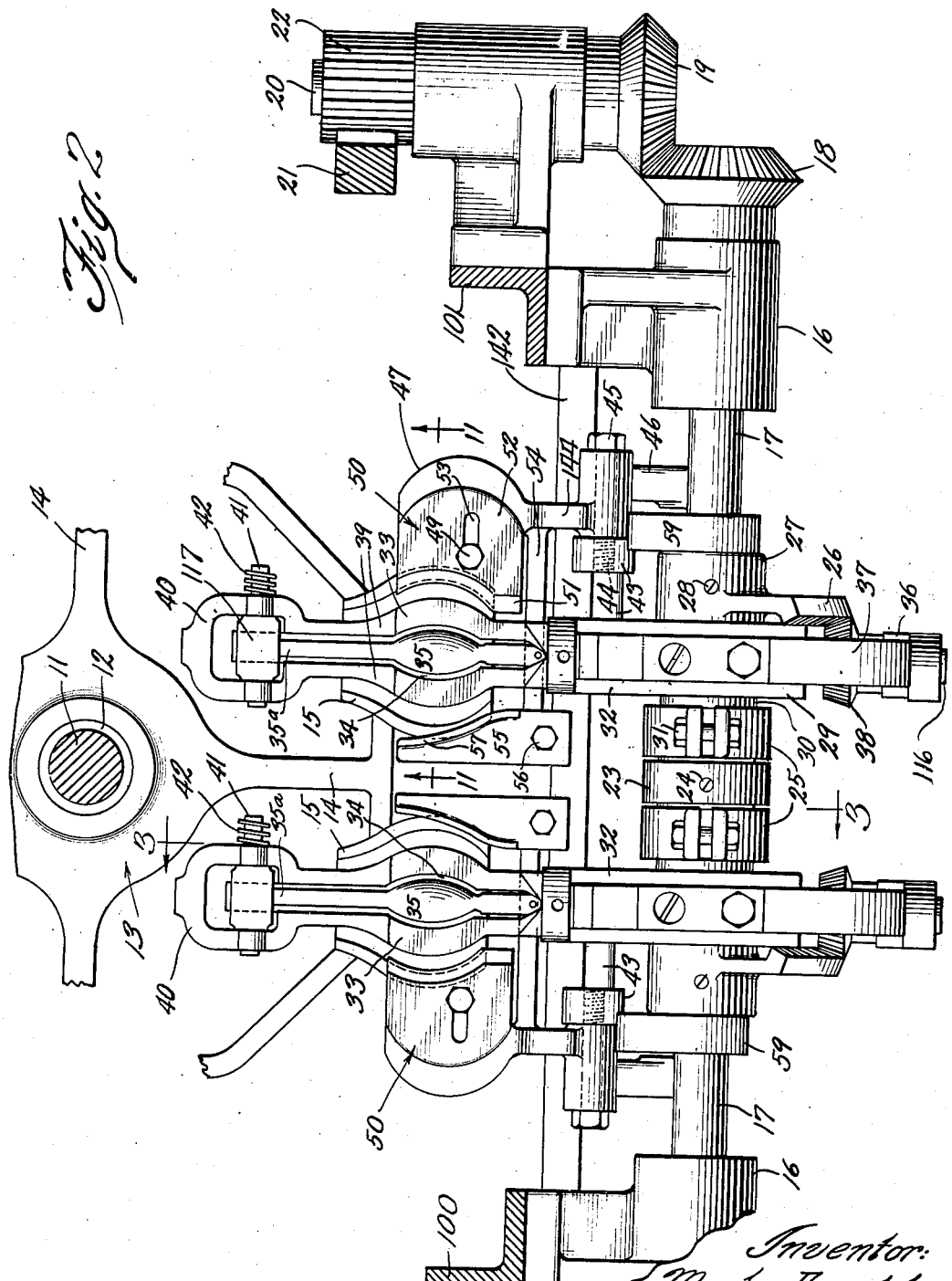

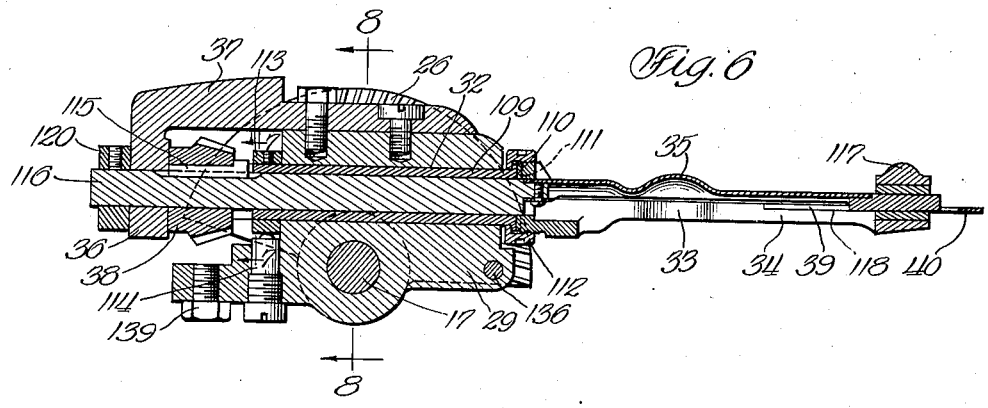
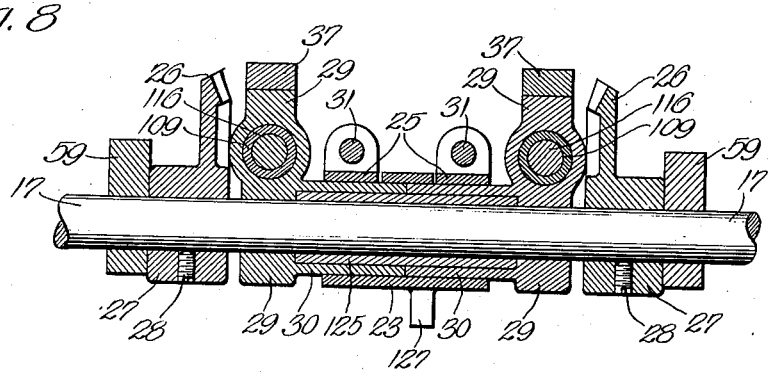
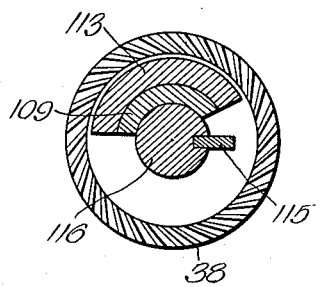

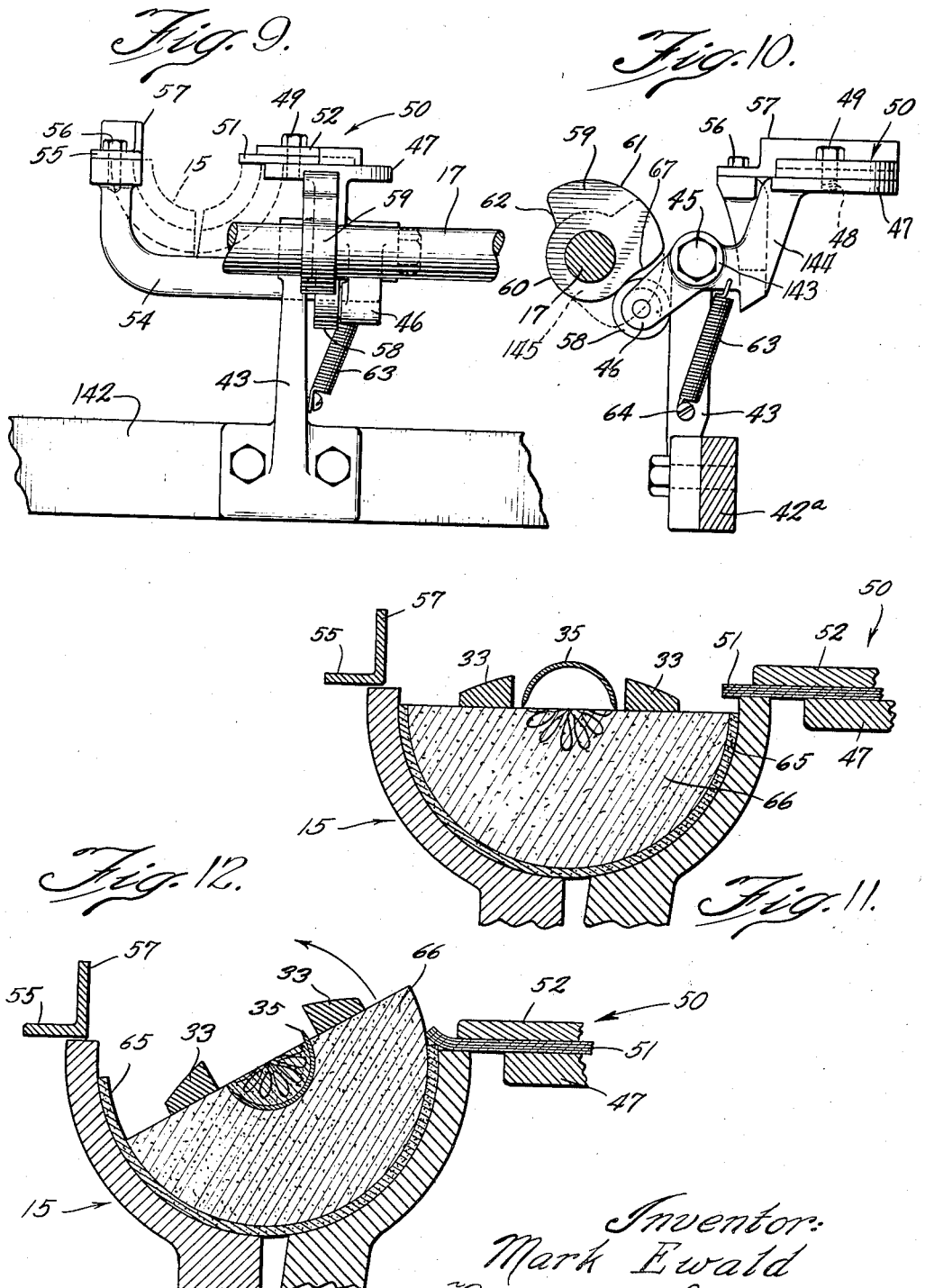

Patented June 13, 1939

2,161,807

UNITED STATES PATENT OFFICE 2,161,807

FRUIT CUTTING AND DISCHARGING MEANS

Mark Ewald, Olympia, Wash., assignor to Special Equipment Company, Portland, Oreg., a corporation of Oregon Application April 4, 1935, Serial No. 14,594
Renewed December 9, 1937

37 Claims. (Cl. 146—38)

This invention relates to fruit treating apparatus. It has to do with a fruit discharging means for separating peeled fruit from its detached peeling.

The apparatus herein described includes a member having a substantially flat face for engaging the cut face of a half fruit section contained in a fruit holder with its severed peel. The substantially flat faced member is movable for transferring the half fruit section thereonto while leaving the peel in the holder.

The present invention is particularly useful in a machine which splits, peels, severs the seed containing section and discharges fruit, but its utility is not confined to such a device.

One of the objects of the present invention is the provision of means for retaining in a fruit holder the fruit peel from a half fruit during the transfer of the body of such fruit from the holder.

Another object of the present invention is the provision of an improved means for discharging a peeled fruit from a fruit holder without concurrently discharging the peel previously severed from such fruit.

A further object of this invention is the provision of improved peel holding means moving in timed relation with a series of intermittently moving receptacles and coming into effective position during a period of rest between movements of such receptacles.

These objects, and such other objects as may hereinafter appear, are obtained by the unique arrangement, novel combination and improved construction of the several elements comprising a single embodiment of the invention which will be fully understood upon a reading of the description that follows and by reference to the accompanying five sheets of drawings, hereby made a part of this specification, and in which:

Figure 1 is a front view of the present fruit seed severing and discharging device on one form of a fruit treating machine;

Figure 2 is a horizontal section taken on the line 2—2 of Figure 1, the seed severing device and peel retaining device being shown in an effective position;

Figure 3 is a section taken on the line 3—3 of Figure 2;

Figure 4 is a front elevation of the mechanism for lifting the half fruit holding and turning paddles from the fruit cups while rotating therein shown in Figure 1;

Figure 5 is a transverse section taken on the line 5—5 of Figure 4;

Figure 6 is a longitudinal section through the half fruit seed severing device shown in Figure 3;

Figure 7 is a cross section taken on the line 7—7 of Figure 6;

Figure 8 is a section taken on the line 8—8 of Figure 6;

Figure 9 is a front elevation of the peel retaining mechanism shown in Figure 2, parts being broken away to clarify the view;

Figure 10 is a side view of the peel retaining mechanism shown in Figure 9;

Figure 11 is a transverse section taken on the line 11—11 of Figure 2; and

Figure 12 is a similar view illustrating the parts shown in Figure 11 at a subsequent stage of operation.

Like reference characters are used in the drawings and throughout the following description for designating similar parts of the invention.

The present invention is illustrated by reference to its adaptation to an automatic machine for discharging half fruit which has been peeled and had the seed containing section severed therefrom. The invention is applicable to a machine for automatically discharging a peeled half fruit in such a manner as to retain the peeling within the fruit holding means, irrespective of whether or not mechanism is associated with the fruit discharging means for severing the seed containing section of the half fruit. In the embodiment of the invention illustrated herein, the discharging mechanism is shown as associated with shiftable cutter mechanism for severing the seed containing section so that half fruit, suitably supported in fruit holding means with the severed peel loosely underlying the half fruit in said fruit holding means, is transported to a fruit discharging station whereat means is automatically provided for discharging the half fruit from the fruit holding means, and whereat means is provided for automatically engaging and retaining the peel within the fruit holding means during the discharging of the half fruit. In addition, preferably at this same station, there has been shown means for severing the seed containing section of the half fruit, but it is to be understood that the discharging and peel retaining mechanism is not restricted for cooperation necessarily with the seed severing mechanism.

A framework for the fruit treating machine comprises four corner uprights 100, 101, 102 and 103 held in position by an upper transverse supporting frame member 104 and a lower transverse frame member 105.

Bearing brackets 70 secured to the lower frame member 105 support a cam shaft 71. A gear 72 is keyed to the cam shaft on one end and a face cam 73 is keyed on the other end. Gear 72 may be driven in any suitable manner. A bevel gear 74 keyed to the cam shaft 71 meshes with a bevel pinion 75 fixed on a vertical stud shaft 76. A driving arm of a Geneva movement is fixed on the upper end of the stud shaft 76. A roller on the driving arm meshes with a Geneva gear 77 fixed to a turret sleeve 12 around a central vertical shaft 11. A brace 78 extending upwardly from the frame member 105 has a bearing block 79 apertured to receive the stud shaft 76 and central shaft 11.

A cam groove 80 in the face of cam 73 coacts with a cam roller 81 pinned to cam follower plate 82. A bracket 83 is secured to the upper end of the follower plate. A rack 21 bolted to the bracket 83 meshes with a pinion 22 which is fixed to a stud shaft 20. A bevel gear 19 keyed on the forward end of stud shaft 20 meshes with a bevel pinion 18 fixed to a horizontal shaft 17. Bearing blocks 16 bolted or otherwise secured to the uprights 100 and 101 provide a support for the shaft 17.

A turret 13 is fixed to the upper end of the turret sleeve 12. The turret 13 has a central hub with radially extending spokes 14 spaced ninety degrees apart around such central hub. Receptacles or holding or supporting means for half fruit 15 are secured to the outer ends of the spokes 14.

A bronze bushing surrounds and frictionally engages the central portion of shaft 17. Collars 30 circumscribe and frictionally engage the outer surface of this bushing meeting midway therealong. A split clutch sleeve 23 frictionally engages the outer surface of collars 30 and additionally is secured thereto by a set screw 24 which bears against bushing 106.

Clutch straps 25 integral with the sleeve 23 frictionally engage the collars 30 and are adjusted by bolts 31 extending through ear 107 on one end of strap 25 and threaded into ear 108 on the other end of strap 25. Integral with the outer ends of collars 30 are compound bearing blocks 29. Segmental level gears 26 having hubs 27 are secured on shaft 17 by set screws 28 adjacent blocks 29.

The paired mechanisms for severing the seed from the half fruit about to be described are identical in shape, operation, and function but the two members of the pair operate in a reverse direction. In the following description, reference will be made to the right hand assembly with the understanding that the description and reference numerals used will apply equally well to the left hand assembly.

A bearing 32 extends tangentially of shaft 17 through the block 29 and has rotatably mounted therein a sleeve 109. (See Figure 6.) A paddle or half fruit holding and/or turning means 33 is rigidly secured to the forward end of sleeve 109 by a tongue 110 meshing with a groove 111 in the sleeve 109. The sleeve 109 and paddle 33 are locked together with a flanged nut 112. A collar 113 is fixed on the rear end of sleeve 109 for engagement with a spring pressed friction member 114 to prevent accidental rotative movement of the sleeve 109. A segment of the sleeve 109 and collar 113 is cut away as shown in Figure 7. A key 115 is secured to a shrank 116 within the confines of the cut away segment in sleeve 109 and collar 113. Key 115 locks a pinion 38 upon the shank 116.

Pinion 38 meshes with segment 26. Seed severing means in the form of turnable cutting means 35 is secured to the forward end of shank 116 and extends into the throat 34 in paddle 33. The extended end of this cutting means, specifically referred to herein as a spoon 35 is rotatably mounted in a bearing block 117 which is integral with paddle 33. A trunnion 41 secured to the bearing block 117 pivotally supports a flipper 40 which has two legs 39.

The legs 39 of flipper 40 lay in recesses 118 in the paddle 33 presenting a flush surface on the face of paddle 33. A coil spring 42 about trunnion 41 and having one end fastened to the flipper 40 and the other end fastened to the trunnion 41 tends to keep the flipper 40 in the recess 188. A bracket 37 bolted on otherwise secured to the block 29 is provided with a bearing 36 that supports the rear end of shank 116. A collar 120 secured on shank 116 prevents longitudinal movement of the shank in one direction while the bevel pinion 38 prevents longitudinal movement in the other direction.

A horizontal transverse frame member 142 bolted to the uprights 100 and 101 has secured thereto a bracket 121. Bearings 122 integral with bracket 121 rotatably support a cam shaft 123. An arm 124 is keyed to the central portion of cam shaft 123.

A cam roller 125 rotataby pinned to arm 124 by bolt 126 is normally in the path of a cam 127 integral with collar 23. A torsion spring 128 around shaft 123 having one end fastened to the arm 124 and the other end to bearing 122 tends to rotate the shaft in a clockwise manner. A pin 129 limits the movement of the arm 124 by abutment with a pin 130 on bearing 122. Cams 131 secured to the outer end of cam shaft 123 by set screws 132 have two camming surfaces 133 and 134, camming surface 134 being of greater diameter.

Cam 131 engages a cam roller 135 rotatably mounted on a pin 136 in the block 29. Adjustable bolts 137 threaded into ears 138 of bracket 121 limit the counter clockwise movement of the block 29 by engaging a bolt head 139 thereon.

Details of the present invention are most clearly illustrated in Figures 2, 9, 11, 11 and 12. The paired peel retaining devices about to be described are identical in shape, operation and function but are reversed. In the following description, reference will be made to the right hand assembly and its cooperation with the right hand assembly of the seed severing device with the understanding that the description and reference numerals will apply equally to the left hand assembly.

A bracket 43 bolted or otherwise secured to transverse frame member 142 is provided with an aperture 44. A bolt 45 is threaded into aperture 44. A hub 143 pivotally mounted on bolt 45 carries a lever having a depending arm 46 and an oppositely extending arm 144. A pad 47 integral with arm 144 has a tapped aperture 48 to receive a bolt 49. A retaining member 50 is adjustably positioned between the pad 47 and head of bolt 49. Member 50 is composed of a flat laminated crescent shaped rubber flap 51 held flatly against pad 47 by a cap 52, the edge of the rubber flap extending beyond the cap 52 and pad 47. A transverse slot 53 through the cap 52 and flap 51 allows adjustment of the retaining unit 50.

A horizontally projecting arm 54 extends laterally from arm 144 of lever 143. The arm 54 has an upturned portion to support an angle bracket 55 having a vertical flange 57 forming a stop.

Angle bracket 55 is positioned on arm 54 by a bolt 56.

The peel retaining device when in its effective position maintains the concave edge of flap 51 projecting slightly over the inside periphery of receptacle 15. The angle bracket 55 in its operative position is slightly above and away from the inside periphery of the receptacle. A roller 58 rotatably secured on a pin in arm 46 engages a cam 59.

Cam 59 fixed on shaft 17 by a set screw 145 has a concentric camming surface 60 continuing into a tangential rising surface 67 merging into a concentric camming surface 61. Camming surface 61 merges into a dropping camming surface 62 which returns to the smaller concentric surface 60. A spring 63 anchored at one end to bracket 43 by a screw 64 and at the other end to arm 144 keeps the roller 58 in constant engagement with the cam 59.

A bracket 68 secured to frame member 104 pivotally supports a finger 69 which swings out of the way of the flipper 40 on its down stroke and is held in a rigid vertical position when the flipper 40 returns on its upstroke.

A half section of a fruit having a peel 65 severed from the body 66 lies within a receptacle 15 with its severed flat face exposed upwardly in a horizontal plane previous to the operation about to be explained.

The operation of the seed severing and, or, discharging mechanism is substantially as follows. As previously stated, the fruit is split and the peel severed from the body of the fruit prior to the fruit arriving at that station of the machine where the seed severing operation and, or, discharging of the fruit is effected.

Power from a suitable source drives the gear 72. Gear 72 imparts rotative movement to cam shaft 71. Bevel gear 74 transfers the rotative movement to stud shaft 76 by the bevel pinion 75. The arm on stud shaft 76, by the means of the cam roller thereon, intermittently rotates the Geneva gear 77. The feed turret 13 by means of the sleeve 12 intermittently rotates with the Geneva gear 77 bringing the receptacles 15 with halved sections of fruit therein into position under the seed severing and/or discharging device.

Concurrently and in timed relation with the advancement of the fruit turret 13, cam roller 81 in the cam track 80 reciprocates the rack 21 in a downward direction. The rack pinion 22 meshing with the rack 21 rotates the stud shaft 20. A bevel gear on the stud shaft 20 meshing with a bevel pinion 19 on shaft 18 imparts a rotative movement to the shaft 17.

The seed severing device frictionally mounted on shaft 17 rotates therewith, swinging it clockwise in a ninety degree arc. The movement of the severing device is arrested by the paddle 33 coming into contact with the body of the fruit 66.

Further rotation of the shaft 17 causes the bevel gears 26 keyed thereon to move therewith, the bevel segments 26 meshing with bevel pinions 38 keyed on shank 116 and causing them to rotate. The seed severing means 35 secured to the forward end of the shank 116 rotates therewith cutting through the body of the fruit around the seed, severing the seed from such body. It is to be understood that means for discharging the peeled half fruit from the fruit holding means, together with the means for retaining the peeling in the fruit holding means, are completely operative independent of whether or not the seed severing means is disposed at the same station as the half fruit discharging and peel retaining means.

Immediately after the seed is severed from the body of the fruit, the entire seed severing mechanism is raised slightly from the face of the fruit to allow the paddle 33 to turn the body of the fruit 66 out of the receptacle 15 without injury that might be caused by pressure of the paddle 33. Slight elevation of the paddle 33 is accomplished by the cam 127 on sleeve 23. As a sleeve 23 rotates with the shaft 17 due to frictional engagement, the cam 127 comes in contact with the cam roller 125 forcing it downward. The arm 124 carrying roller 125 oscillates with the roller 125 imparting a counter clockwise rocking motion to the shaft 123. The cams 134 keyed to the ends of shaft 23 are directly under and in contact with rollers 135 on the bearing block 29 of the seed severing device. Thus, when the cam 134 rotates with the shaft 123, it will bring a high portion of the cam into engagement with the roller 135 raising the compound block 29 carrying the paddle 33.

While the half fruit holding and discharging means 33 is in its slightly elevated position, the key 115 on shaft 116 comes into engagement with the segment on sleeve 109. Further rotative movement of the shaft 17 through the bevel gear 26 and pinion 38 moves the shaft 116 and key 115 in a clockwise direction (figure 7). When the key 115 comes into engagement with the sleeve 109 and continues to rotate, it forces the sleeve 109 along therewith.

The paddle 33 being secured to the forward end of the sleeve 109 rotates in the same manner as the sleeve. Further rotative movement of the paddle 33 engaging the flat face of the half fruit body 66 rolls or turns the fruit around in the receptacle 15 about an axis passing substantially through a central axis of the half fruit located at the cut face of the half fruit, bringing the edge of the half fruit 65 into engagement with the rubber flap 51. The flap 51 arrests further movement of the peel. Further relative movement of the paddle 33 causes the body of the fruit to turn relatively to the peel. The rotative movement of the paddle 33 is arrested at approximately one hundred eighty degrees from the starting position. Because the spoon is in an inverted position, the seed will drop back into the receptacle. The body of the fruit 66 is maintained against transverse movement across the paddle due to the wiping action of the flap 51 against the curved side walls of the half fruit by the angle bracket 55 or stop means 55.

Shaft 17 then reverses its direction due to the rise in the cam track 89. The seed severing device frictionally engaging the shaft 17 is swung outwardly in a ninety degree arc. At the end of the ninety degree movement, the flipper 40, coming into engagement with the finger 69, is tripped back around the trunnion 41 causing the legs 39 to swing away from the face of the paddles 33, ejecting any fruit that has adhered thereto.

Continued rotation of the shaft 17 causes the cam 59 to force the roller 58 down. The roller 58 on the lower arm 46 of the lever 143 swings the upwardly extending arm 144 in a counter clockwise direction (Figure 10) elevating the peel retaining device 50 and thus allowing the receptacles 15 to rotate therepast. The receptacles 15 after passing under the peel retaining device 50 in their elevated positions rotatively advance to the scavenging station where the peels and seed containing sections remaining in the receptacles are removed.

The subject matter disclosed but not claimed in the present application is claimed in other of my pending applications, including application Serial No. 614,062, filed May 28, 1932; Serial No. 637,708, filed October 14, 1932; and Serial No. 746,952, filed October 5, 1934.

What is claimed as new and is desired to be secured by Letters Patent of the United States is:

1. In combination, fruit supporting means for a peeled half fruit and its peel, means for discharging the peeled fruit from said supporting means, and means associated with the fruit supporting means and engaging a section of such peel during the discharge of the fruit from said supporting means to retain the peel in said supporting means.

2. In combination, supporting means for a peeled fruit and peel detached therefrom, means for moving the peeled fruit, and a flexible member adapted to contact with the periphery of the peeled fruit when the fruit is moved for retaining the peel in said supporting means.

3. In combination, a receptacle supporting a peeled fruit section and its detached peel, discharging means comprising one member for moving the peeled fruit relatively to and out of said receptacle, and a second member operable on the peel and fruit for retaining the peel in said receptacle while not interfering with the movement of the fruit.

4. In combination, a receptacle supporting a fruit section and its detached peel, fruit discharging means comprising a member for moving the peeled section relatively to and out of said receptacle, and a second member at an edge of said receptacle and conforming to a longitudinal peripheral section of said receptacle for obstructing movement of the peel from said receptacle.

5. In combination, a series of fruit receptacles each supporting a half fruit section and its detached peel, fruit discharging means adapted to register with succeeding fruit receptacles and to move therethrough to impart a discharging movement to the peeled fruit therein, and other means also registering with said receptacles one after another during the operation of said fruit discharging means to retain the peel in said receptacles.

6. In combination, a cup for fruit and its separated peel, means for moving the fruit out of said cup, means disposed in the path of movement of the fruit for retaining the peel in the cup during the movement of the fruit, and means for preventing displacement of the fruit from the means moving it out of the cup.

7. In combination, a cup for fruit and its separated peel, means for holding the cup stationary, means for moving the fruit from the cup while holding the cup stationary, means separate from the cup for arresting movement of the peel with the fruit, and means for preventing sliding movement of the fruit upon the means moving it from the cup.

8. In combination, a member holding fruit with its peel detached, a discharging member for the fruit, a retaining member for the peel, and means for actuating said several members in synchronism to separate the fruit from its detached peel and from said retaining member.

9. In combination, a receptacle for fruit and its detached peel, a discharge member sweeping said receptacle free from fruit, guide means maintaining the fruit upon said discharge member, and means engaging the edge of the peel for retaining the peel in said receptacle while the discharge member sweeps therethrough.

10. In combination, a fruit cup, a fruit discharge means in juxtaposition to said cup, a peeling retaining member also in juxtaposition to said cup, and means for moving the discharge means relatively to said peel retaining member to separate fruit in said cup from the peel previously detached from such fruit in said cup.

11. The combination described in claim 10, having guide means for maintaining the fruit in operative relationship to said discharge means.

12. In combination, a receptacle for supporting fruit with the peel severed therefrom, means for positively discharging the fruit from the receptacle, and yieldable means disposed in the path of movement of the fruit as it is discharged from said receptacle and adapted yieldingly to contact the severed peel to retain the same in the receptacle while permitting discharging movement of the fruit from the receptacle.

13. In a fruit treating machine, the combination of means forming a fruit holder holding fruit with the peel severed therefrom, means causing relative movement between said holder and fruit therein for ejecting the fruit bodily from the holder, and yieldable means adapted to contact the loose peel of the fruit in the holder during the relative movement of the fruit and its fruit holder for retaining the peel in the fruit holder while permitting discharge of the fruit therefrom.

14. In a fruit treating machine, the combination of a fruit holder shaped to conform to the curved surfaces of a half fruit from which the peeling has been severed, means for turning the half fruit on its axis, and means yieldingly engaging the peel and the fruit for retaining the peel in the fruit holder while permitting the turning of the fruit to discharge the peeled fruit from the fruit holder.

15. In a fruit treating machine, the combination of a fruit holder shaped to conform to the curved surfaces of a half fruit from which the peeling has been severed, means for turning the half fruit on its axis, and means yieldably engaging the peel of the fruit for retaining the peel in the fruit holder while permitting the turning of the fruit to discharge the peeled fruit from the fruit holder.

16. In combination, a fruit cup adapted for supporting a half fruit upon the peel which has been severed therefrom, a substantially flat, crescent-shaped, flexible flap overlying a peripheral portion of the receptacle in the path of movement of the peripheral portion of the half fruit and its peel, and means for turning the half fruit while in the cup to a discharging portion, said flap yieldingly permitting the turning of the fruit while retaining the peel in the cup.

17. The combination of a receptacle for supporting a half fruit upon peel which has been severed therefrom, means for discharging the peeled fruit from said receptacle, and a substantially flat laminated rubber flap disposed to slightly overlie the periphery of the receptacle in the path of movement of the curved periphery of the fruit during its discharge for retaining the peel in the receptacle, said flap yielding to permit the discharge of the peeled fruit from the receptacle.

18. In a fruit treating device, the combination of a turret for carrying the fruit cup thereon, means to move the turret to move the cup in a predetermined path to a peeled fruit discharging station, said cup carrying a half fruit lying on the peel centered therefrom, means at said station for discharging the fruit from said cup, and means at said station under which a portion of the cup is adapted to move whereby said means is adapted to overlie a portion of said cup, said means being constructed and arranged to retain the peel in said cup upon the discharge of the fruit from said cup.

19. In a fruit treating machine, the combination of a fruit holder adapted to receive a half fruit therein lying upon its severed peel, fruit discharge means at said station for bodily moving the fruit out of its holder, and means positioned to overlie the peel in the holder when said holder is brought to said station whereby upon discharge movement of the fruit from the holder said overlying means will contact said peel to retain the peel in the holder.

20. In a fruit treating machine, the combination of a fruit holder adapted to engage the curved surfaces of a half fruit from which the peeling has been severed, and wherein the severed peeling underlies the curved surface of said fruit, means for turning the half fruit on its axis while in its holder, and means yieldingly overlying a portion of the cut face of the fruit and the edge of the peel whereby on turning movement of the half fruit said means will wipingly engage the cut curved surface of the half fruit and will yield to permit turning movement of the half fruit, and will likewise engage the edge portion of the severed peel whereby to retain the peel in the holder.

21. In combination, a receptacle for supporting a half fruit upon its peeling which has been severed therefrom, means for discharging the peeled fruit from said receptacle, and movable means adapted to be contacted by the movement of the fruit in discharging from its receptacle whereby to allow the fruit to pass said movable means and whereby to retain the peeling within the receptacle.

22. In a fruit treating machine, the combination of recessed holding means for holding a half fruit with its cut face exposed, said half fruit having an arcuate line of severance formed through the flesh thereof beginning and ending at the cut face of the half fruit whereby to provide a plurality of severed portions, separate means adapted to engage said severed portions, one of said engaging means functioning to retain the portion engaged by it in said holding means, the other engaging means contacting the cut face of the half fruit, and means for actuating such other engaging means bodily to shift the portion engaged by such other engaging means out of said holding means to discharge it therefrom free of said first mentioned portion.

23. In a fruit treating machine, the combination of recessed holding means for holding a half fruit with its cut face exposed, said half fruit having a portion thereof severed therefrom and lying in the same position with respect to the half fruit as it occupied before severance therefrom, means engaging the cut face of the half fruit for bodily discharging it from the recessed holding means, and means for engaging said severed portion to prevent it from being discharged from said holding means when the half fruit is so discharged.

24. In a fruit treating machine, the combination of recessed means for supporting a half fruit by contact with the curved walls of the half fruit, said half fruit having a portion severed therefrom by an arcuate line of severance starting at the cut face of the half fruit and passing through the body of the half fruit and ending at the cut face of the half fruit, means for contacting one portion of the half fruit at one part of its cut face to retain said contacted portion from being discharged from the holding means, and means for turning another portion of the half fruit relative to its supporting means and about an axis passing substantially through the cut face of the half fruit whereby to discharge the turned portion from the holding means, leaving the retained portion in the holding means.

25. In combination, recessed holding means for supporting a half fruit with a portion of the half fruit severed therefrom and lying in the same position relative to the half fruit that it would have occupied prior to its severance, means for discharging the half fruit from its holding means, and means adapted to contact the severed portion during the discharge of the half fruit from its holding means for retaining the severed portion in the holding means.

26. In combination, a receptacle for holding a half fruit with its cut face uppermost, the half fruit having a portion severed therefrom and lying in the same normal position with respect to the half fruit that such portion occupied prior to severance, means adapted to overlie and contact the cut face of the half fruit and shiftable to discharge the half fruit from said receptacle, and means adapted contactingly to engage the severed portion for holding the latter within the receptacle during the discharge of the half fruit from said receptacle.

27. In combination, a receptacle for supporting a half fruit with its cut face uppermost and with its peel severed therefrom and underlying the half fruit in the receptacle, means adapted to be positioned on substantially diametrically opposite sides of the receptacle adjacent the open mouth thereof, one of said means on one side adapted slightly to overlie the inner wall of said receptacle, means adapted to engage the cut face of the half fruit in said receptacle substantially to invert said half fruit with respect to its receptacle whereby to discharge it therefrom, said means overlying the inner wall being adapted to engage the severed peel during the inversion of said half fruit whereby to retain said severed peel within said receptacle, the other means preventing substantial lateral movement of said inverted half fruit with respect to said receptacle when contacted by said peel retaining means.

28. In combination, holding means for supporting a half fruit upon its severed peeling, means for discharging the peeled fruit from said holding means, and means adapted to engage the peeling in said holding means for retaining the peeling therein during the discharge of the half fruit.

29. In combination, recessed holding means for supporting a half fruit upon its severed peeling, means for discharging the peeled fruit from said holding means, means adapted to engage the peeling in said holding means for retaining the peeling therein during the discharge of the half fruit, and means for adjusting said peel retaining means relatively to the recessed holding means to accommodate variant sizes of half fruit.

30. In an automatic machine for treating half fruit, the combinaion of an intermittently operable turret provided with a plurality of spaced apart recessed holding means adapted to move in a horizontal plane with the open faces of the holding means facing upwardly and each adapted to receive a half fruit therein with its cut face uppermost and with the peeling severed therefrom and loosely underlying the half fruit within the recessed holding means, half fruit discharging mechanism mounted to operate above said turret and including means for shifting said mechanism into and out of contact with the cut face of the half fruit while in said holding means, means for actuating said last mentioned means bodily to discharge the half fruit from its holding means, and means automatically actuated in synchronism with the intermittent movements of the turret and said holding means and adapted to be shifted toward and from a holding means, said last named means including a part adapted to be shifted into contact with and overlie a portion of the cut face of the half fruit to retain the peel within the holding means during the discharging movement of the half fruit.

31. In an automatic machine for treating half fruit, the combination of an intermittently operable turret provided with a plurality of spaced apart recessed holding means adapted to move in a horizontal plane with the open faces of the holding means facing upwardly and each adapted to receive a half fruit therein with its cut face uppermost and with the peeling severed therefrom and loosely underlying the half fruit within the recessed holding means, half fruit discharging mechanism mounted to operate above said turret and including means for shifting said mechanism into and out of contact with the cut face of the half fruit while in said holding means, means for actuating said last mentioned means bodily to discharge the half fruit from its holding means, and means automatically actuated in synchronism with the intermittent movements of the turret and said holding means and adapted to be shifted toward and from a holding means, said last named means including a part adapted to be shifted into contact with and overlie a portion of the cut face of the half fruit to retain the peel within the holding means during the discharging movement of the half fruit, and including a second portion adapted to be positoned opposite said peel retaining means on the other side of the fruit holding means for preventing substantial lateral displacement of the half fruit relatively to the holding means when discharged from said holding means.

32. In an automatic machine for treating half fruit, the combination of an intermittently operable turret provided with a plurality of spaced apart recessed holding means adapted to move in a horizontal plane with the open faces of the holding means facing upwardly and each adapted to receive a half fruit therein with its cut face uppermost and with the peeling severed therefrom and loosely underlying the half fruit within the recessed holding means, half fruit discharging mechanism mounted to operate above said turret and including means for bodily turning the fruit upon one of its diametral axes to invert the fruit from and out of its holding means, and including means for shifting said mechanism into and out of contact with the cut face of the half fruit while in said holding means, means for actuating said last mentioned means bodily to discharge the half fruit from its holding means, and means automatically actuated in synchronism with the intermittent movements of the turret and said holding means and adapted to be shifted toward and from a holding means, said last named means including a part adapted to be shifted into contact with and overlie the cut face of the half fruit to retain the peel within the holding means during the discharging movement of the half fruit, and including a second portion adapted to be positioned opposite said peel retaining means on the other side of the fruit holding means for preventing substantial lateral displacement of the half fruit when discharged from said holding means.

33. In an automatic machine for treating half fruit, the combination of an intermittently operating turret provided with a plurality of spaced apart, recessed holding means adapted intermittently to move in a horizontal plane and provided with open faces facing upwardly and each adapted to receive a half fruit therein with its cut face uppermost and with the peeling severed therefrom and lying loosely beneath the half fruit within the recessed holding means, seed severing and half fruit discharging mechanism adapted to be shifted into overlying contact with the cut face of the half fruit during a rest period of the turret, means for actuating the said mechanism, said mechanism including arcuately moving cutting means for severing through the flesh of the half fruit to remove the seed containing section therefrom, and said mechanism including means for contacting the cut face of the half fruit on opposite sides of said seed containing section and including means for shifting the contacting means whereby to shift the half fruit relative to its holding means to invert it with respect to said holding means, and peel retaining means shiftably mounted relatively to and above said turret and said recessed holding means and adapted to be shifted toward and from said recessed holding means to a position to overlie slightly the inner wall of said holding means into contact with the loose peel in said holding means and to be moved away from said recessed means to permit the intermittent movement of the turret, said peel retaining means serving to engage the peel during the inversion of the half fruit whereby to retain the peel within the recessed means.

34. In combination, half fruit holding and supporting means for supporting a half fruit upon peeling which has been severed therefrom, means for discharging the peeled fruit from said holding means, and means actuated by movement of said half fruit relative to its holding means for retaining such peeling in said holding means, said retaining means allowing the discharge of said half fruit from said holding means.

35. In combination, holding means for supporting a half fruit with its severed peeling in its normal position, and means for discharging the peeled fruit from its holding means and for simultaneously retaining the peeling on the supporting means.

36. In combination, holding means for supporting a half fruit upon its severed peeling, means for discharging the peeled fruit from said holding means, and means normally disposed out of contact with said half fruit and having relative movement with respect to said half fruit for contacting the peeling of said half fruit upon said relative movement to retain said peeling from discharge with said half fruit.

37. In a fruit treating machine, the combination of holding means for holding a half fruit with its cut face exposed, said half fruit having an arcuate line of severance formed through the flesh thereof beginning and ending at the cut face of the half fruit, whereby to provide a plurality of severed portions, separate means adapted to engage said severed portions, one of said engaging means functioning to retain the portion engaged by it on said holding means, the other engaging means overlyingly contacting at least one portion of the cut face of the half fruit to one side of the seed-containing section thereof, and means for actuating such last mentioned half fruit engaging means bodily to shift the portion engaged by it from said holding means to discharge it therefrom free of said first mentioned portion.

MARK EWALD.